May 29, 1962     W. WEIGL     3,037,188

VEHICLE SAFETY SIGNAL

Filed Nov. 12, 1958

INVENTOR.

William Weigl

United States Patent Office 3,037,188
Patented May 29, 1962

3,037,188
VEHICLE SAFETY SIGNAL
William Weigl, 4328 Wyatt Road, Cleveland 28, Ohio
Filed Nov. 12, 1958, Ser. No. 773,483
15 Claims. (Cl. 340—91)

This invention relates generally to safety signals for automotive vehicles, and in particular to a visual flashing signal indicating that the operator is driving or about to drive the vehicle in reverse.

Numerous types of audible signals are known which operate to warn a person at the rear of a vehicle that the vehicle is moving or about to move in reverse. While these signals serve adequately as a warning to those in the immediate vicinity of the vehicle, they are ineffectual as a warning to persons some distance away, for example, in another approaching vehicle. Back-up lights on a vehicle solve this latter problem in part, but being white light, and being continuous light, they are practically unnoticeable in daylight.

Another problem the audible signals fail to solve is the backing of two autos into each other. This has become quite commonplace in huge supermarket parking areas where angle parking has been instituted. To make best advantage of space, most such lots are laid out with alternate one-way narrow aisles and parking at an angle on each side of the aisle. When backing out of a parking space, the movement of your car often makes it difficult to notice someone backing toward you. The identical problem is present when backing out from a driveway which is exactly opposite another's drive on the other side of the street.

The present invention aims at a solution to these problems by utilizing an already well-recognized danger or safety signal to warn that a party in another vehicle is either backing up, or about to do so. It is accomplished by flashing both of the red brake lights together in the manner in which emergency, police, and other vehicles now flash the lights to indicatae an emergency stop.

The principal object of this invention is to provide a flashing light at the rear of an automotive vehicle when the vehicle is moving or about to be moved in reverse.

Another object of the invention is to operate such a flashing light from a means for conditioning the vehicle to be driven in reverse.

A further object of the invention is to utilize standard directional signalling means as the flashing back-up signal.

More specifically, it is an object of the invention to utilize both of a pair of directional signal lights as a back-up warning signal, and to control the operation of both lights from a means for operating the vehicle in reverse.

It is another object of the invention to provide means indicating left turn, right turn, and back-up signals by utilizing a pair of lamps at each the front and rear of the vehicle, with means for detecting which, if any, of the lamps is burned out by a simple operation of a selector switch for the signals.

Still another object of the invention is to provide an immediate warning to an operator that one of his brake lights has burned out.

Other objects and advantages will be apparent from the following description and drawings.

According to the invention, directional flashing signal lights are controlled in the conventional manner from a selector switch having left turn, neutral, and right turn signal positions, the selector switch having the customary contacts which enable both lights to be operated by a brake light switch when in neutral, and that light other than the one being flashed to be operated by the brake light switch when the selector switch is in one of the other positions. Interposed in the circuitry to the lamps through the flasher and the brake light switch is another switch means controlled in response to shifting of the gears to reverse condition, to disconnect the brake light circuit and connect both lamps to the flasher circuit. When operated in reverse, both lamps will flash, but when operated forward, the directional signalling is accomplished in its usual manner.

Figure 1:
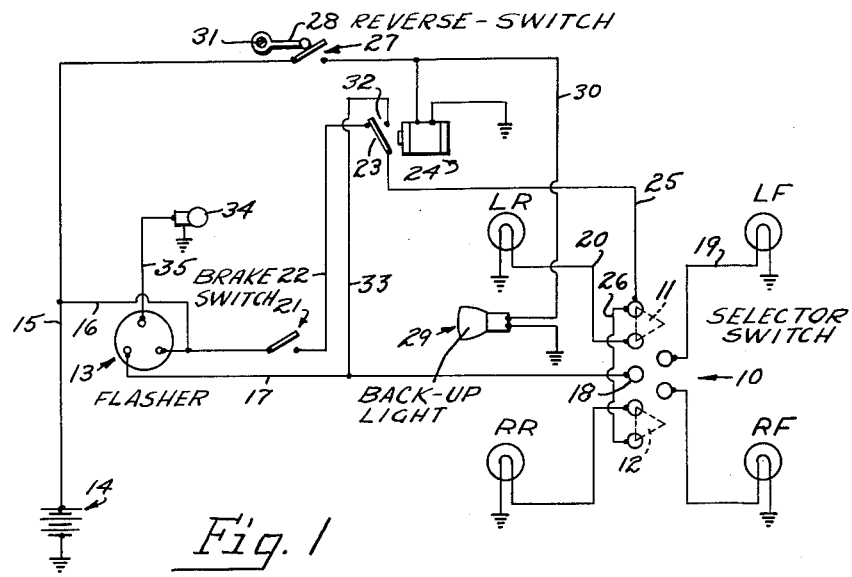
FIG. 1 is a schematic wiring diagram showing a first form of the invention embodied in a conventional directional signal circuit.

Referring now to FIG. 1, LF, RF, LR, and RR are conventional left front, right front, left rear, and right rear directional signal lamps respectively. Customarily, the front lamps are covered by white lenses, while the rear lamps are covered by red lenses. A directional signal selector switch 10 is provided with the usual stationary contacts and contact plates 11 and 12 of any desirable type. A flasher 13 which has the regular intermittently engaged, make-and-break contacts when energized, connects the selector switch 10 to a battery 14 through leads 15, 16 and 17. When the contact plates are in the position shown, none of the lamps are connected to the flasher circuit. This is the neutral position of the selector switch 10. When, however, the operator desires to signal a left turn, he moves a handle (not shown) to the left turn signal position, and contact plate 11 will move toward plate 12 to connect a terminal 18 to terminals connected to leads 19 and 20. This will complete a circuit through the flasher 13 and lamps LF and LR will flash accordingly. When the handle is moved out of the left turn signal position, either automatically by rotation of means connected to the steering column of the automobile, or manually, the contact plate 11 is returned to its original position, and lamps LF and LR will discontinue flashing. When the handle is moved to the right turn signal position, lamps RF and RR will be connected to the flasher circuit in similar fashion.

Lamps LR and RR also constitute the brake-operated lights which are continuously energized when the operator steps on the brake pedal. A brake-operated light switch 21 connects the battery 14 to lamps LR and RR through the leads 15 and 16, the switch 21, a lead 22, a set of normally-closed contacts 23 of a relay coil 24, and leads 25 and 26. When the brake switch 21 is closed with the selector switch 10 in the neutral condition shown, both lamps LR and RR will operate continuously through the contact plates 11 and 12 as long as the operator keeps his foot on the brake pedal. When the selector switch 10 is in its left turn signal position with the plate 11 moved toward plate 12, lamps LF and LR will flash as previously described, but lamp RR will get a continuous brake signal through lead 26 and contact plate 12 if the brake switch 21 is closed. The reverse of this is true when the selector switch 10 is operated to signal a right turn. Then, lamps RF and RR will flash, and LR is connected to the brake light circuit for continuous energization as required. Everything thus far described is standard equipment on all new autos manufactured at this time with the exception of the normally closed contacts 23.

In order to enable the use of this conventional circuitry and apparatus in the usual way when driving forward, and to further enable its use for signalling that the auto is being or about to be driven in reverse, I disconnect the brake light switch 21 from controlling the lamps LR and RR, and connect those lamps to the flasher circuit while the selector switch 10 is in its neutral position. I effect these operations by moving a gear shift lever (not shown) to reverse condition. In this fashion, I am able to flash both lamps LR and RR together whenever the auto is being driven in reverse, and I can do these even though the selector switch 10 is in its neutral position.

One means for accomplishing the aforesaid objective is to provide a normally open switch 27 and mount the switch for operation by a lever 28 operatively connected in any manner to the gear shift lever of the auto. Switch 27 may, and preferably does, constitute a back-up light switch connected to a back-up light 29 through leads 15 and 30.

Operation of the gear shift to reverse condition will move the lever 28 clockwise on a shaft 31 to close the switch 27. This of course will provide back-up light 29 with continuous white light. At the same time, switch 27 connects relay coil 24 to the battery 14 to energize the coil. When this occurs, the normally closed contacts 23 in the brake light circuit are opened, and further operation of the brake will be ineffectual to operate lamps LR and RR. Simultaneously, a set of normally open contacts 32 of relay 24 are closed, to connect lead 25 to the flasher 13 through leads 17 and 33, and the now-closed contacts 32. As long as switch 27 remains closed to energize relay coil 24, both lamps LR and RR will flash. This continues only while the car has its gear shift in reverse. Once it is removed from its reverse condition, the contacts 32 will again open and contacts 23 will again close. The brake lights and directional signals will therefore reassume their customary forward-driving conditions.

A pilot lamp 34 is connected to the flasher 13 by a lead 35 and will flash either at the selector switch or on the dashboard of the auto. This it will do whenever at least two lamps are operating, consequently it will operate when driving forward and signalling for either a right or left turn, and when driving in reverse when the selector switch is in neutral position. Ordinarily, an operator will never have occasion to have the selector switch in any position other than neutral when backing up. If, however, he has it in one of the other positions when backing up, no harm will be done. Instead of only the two lamps LR and RR operating, however, one of the lamps LF or RF will operate also.

The flasher 13 is preferably of the type shown and described in U.S. Pat. 2,803,811 to E. J. Turney. It is specifically designed to prevent operation of the pilot lamp under certain conditions of the selector switch 10 if one of lamps LF, RF, LR or RR has burned out. It requires flashing of at least two of these lamps to flash before the pilot lamp will flash. This enables me to easily detect which of these lamps has burned out, by simply operating the selector switch 10 and the gear shift lever and watching the pilot lamp 34. For example, by leaving the selector switch 10 in neutral position, the gear shift lever can be operated to reverse to close the switch 27. If the pilot lamp flashes, both rear lamps are good. Then, the gear shift lever is moved to some condition other than reverse, and the selector switch 10 operated first to signal a left turn and then a right turn. If the pilot lamp fails to flash for one of the turn signals, the corresponding front lamp should be removed and replaced. If one of the rear lamps has burned out, that can first be noticed when the pilot lamp does not flash with the car in reverse gear. To detect which one of the LR or RR lamps has burned out, the gears are taken out of reverse, and selector switch 10 is operated to its left and then right turn signal positions. If the pilot lamp flashes only when the left turn signal is desired, it is an indication that lamp RR has been burned out. If the lamp flashes when the right turn signal is desired, LR must be replaced.

It will be readily appreciated that the feature of flashing the pilot lamp while backing up serves still another important function. If the pilot lamp fails to flash at such time, it is an immediate warning to the operator that one of his brake lights has burned out.

Figure 2:
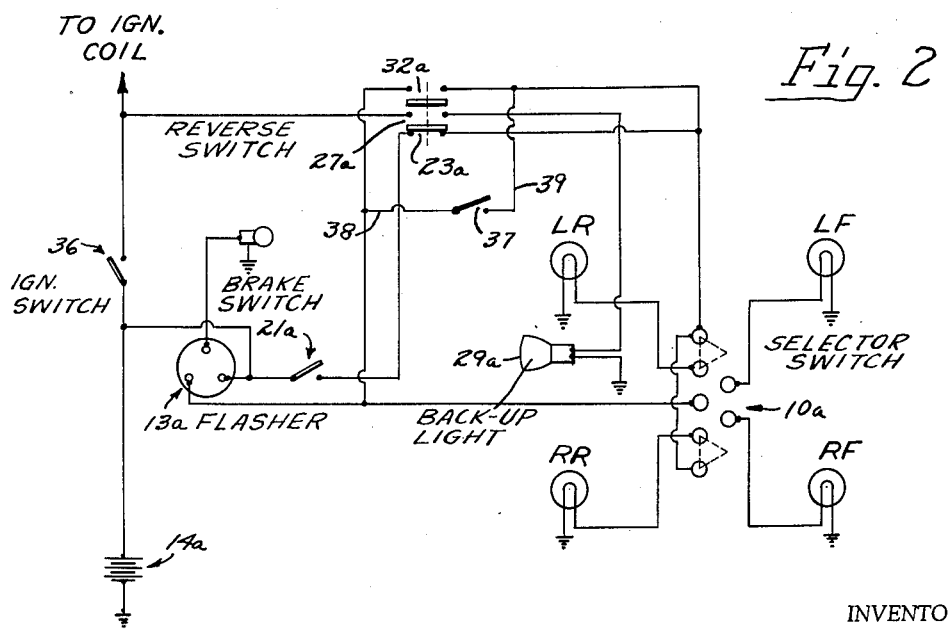
FIG. 2 illustrates a second form of the invention in the same environment, but using another form of control for flashing both lamps.

In FIG. 2, I show the same idea with a slight varia-tion. I alter the back-up light switch 27a to include also the contacts 23a and 32a which in FIG. 1 were operated by the relay 24. The contacts as shown, are adapted to be moved upwardly in response to shifting the gears to reverse. When this is done, switch 27a connects back-up light 29a to battery 14a; contacts 23a open to prevent the lamp LR and RR from being energized through brake-operated right switch 21a; and contacts 32a close to connect flasher 13a to both of lamps LR and RR. An ignition switch 36 lies intermediate the battery 14a and switch 27a. This prevents operation of both lamps LR and RR, as well as back-up light 29a, if the gear shift is left in reverse when the car is parked.

To enable use of the same circuitry as a safety signal for flashing both lights during emergency parking, without requiring the ignition switch 36 to be closed at the time, a normally open switch 37 and leads 38 and 39 may be provided to by-pass the contacts 32a. When switch 37 is closed, the two rear lights may be flashed even though the car's ignition is off. If desired, the selector switch 10a can be moved to either its right or left position, and the corresponding light on the front of the vehicle will also flash.

Various modifications may be made without departing from the spirit and scope of the invention.

Having described my invention, I claim:

1. Signal means for an automotive vehicle having a source of electrical energy and a transmission capable of being selectively shifted between forward and reverse driving conditions, and means for shifting said transmission from one to the other of said conditions, comprising a lamp at the rear of said vehicle, a first electrical circuit connecting said lamp to the electrical source, intermittently engaged make-and-break flashing contacts in said circuit, a first normally open switch in said circuit, a brake signal circuit connected to said lamp in parallel with the first circuit, a brake-operated normally open switch in said brake signal circuit, a normally closed switch in the brake signal circuit, and means operatively connecting the first switch and the normally closed switch to the shifting means when the latter is operated to its reverse driving condition for closing the first switch and for opening the normally closed switch to disconnect the brake signal circuit from said lamp.

2. The invention set forth in claim 1 wherein the first normally open switch and the normally closed switch comprise contacts of a relay which is energized in response to operation of the shifting means to its reverse driving condition.

3. The invention set forth in claim 1 wherein the first normally open switch and the normally closed switch comprise manually operated contacts actuated in response to operation of the shifting means.

4. Signal means for an automotive vehicle having a source of electrical energy, comprising right and left lamps on the rear of said vehicle, a flasher circuit adapted to connect the lamps to the electrical source, manually operated selector switch means in said flasher circuit having one position for connecting the flasher circuit with the left lamp, another position for connecting the circuit with the right lamp, and a neutral position disconnecting both lamps from the source through the flasher circuit, intermittently engaged make-and-break contacts in the flasher circuit, a brake signal circuit connected to said lamps in parallel with the flasher circuit, a brake-operated normally open switch in said brake signal circuit, electrical contacts operated by the selector switch means and connecting both lamps to the brake signal circuit when in neutral position and connecting only the lamp other than the one being selectively flashed to the brake signal circuit when the selector switch is in one of the other positions, means connecting the flasher circuit to the brake circuit including a normally open switch in the connecting means, a normally closed switch in the brake signal circuit intermediate the electrical source and the point of connection of the flasher and brake signal circuits, and means for operating the last-named normally open and normally closed switches to opposite conditions whereby both lamps will flash simultaneously whenever the selector switch is in neutral position and the normally open switch is closed.

5. The invention set forth in claim 4 where the normally open and normally closed switches comprise contacts of an electrical relay.

6. The invention set forth in claim 4 wherein the normally open and normally closed switches are manually operable.

7. Signal means for an automotive vehicle having a source of electrical energy, comprising a pair of lamps at the rear of said vehicle, a first electrical circuit adapted to simultaneously connect both of said lamps to the electrical source, intermittently engaged make-and-break flasher contacts in said circuit, a normally open switch in said circuit, a brake signal circuit connecting the electrical source to said lamps in parallel with the first circuit, a brake-operated normally open switch in said brake signal circuit, and means operable in response to placing the vehicle in a given operating condition for operating the normally open switch to a closed condition to flash both of said lamps simultaneously through the first electrical circuit.

8. Signal means for an automotive vehicle having a source of electrical energy, comprising right and left lamps on the rear of said vehicle, a flasher circuit adapted to connect the lamps to the electrical source, manually operated selector switch means in the flasher circuit having one position for connecting the flasher circuit with the left lamp, another position for connecting the circuit with the right lamp, and a neutral position disconnecting both lamps from the source through the flasher circuit, intermittently engaged make-and-break contacts in the flasher circuit, a brake signal circuit connected to said lamps in parallel with the flasher circuit, a brake-operated normally open switch in said brake signal circuit, electrical contacts operated by the selector switch means and connecting both lamps to the brake signal circuit when in neutral position and connecting only the lamp other than the one being selectively flashed to the brake signal circuit when the selector switch is in one of the other positions, means connecting the flasher circuit to the brake signal circuit between the brake operated switch and said lamps, a normally open switch in the last-named connecting means, and means operable in response to placing the vehicle in a given operating condition for closing the normally open switch to flash both lamps simultaneously with the selector switch in neutral position.

9. Signal means for an automotive vehicle having a source of electrical energy and a transmission capable of being selectively shifted between forward and reverse driving conditions, and means for shifting said transmission from one to the other of said conditions, comprising right and left lamps on the rear of said vehicle, a flasher circuit adapted to connect the lamps to the electrical source, manually operated selector switch means in said flasher circuit having one position for connecting the flasher circuit with the left lamp, another position for connecting the circuit with the right lamp, and a neutral position disconnecting both lamps from the source through the flasher circuit, intermittently engaged make-and-break contacts in the flasher circuit, a brake signal circuit connected to said lamps in parallel with the flasher circuit, a brake-operated normally open switch in said brake signal circuit, electrical contacts operated by the selector switch means and connecting both lamps to the brake signal circuit when in neutral position and connecting the lamp other than the one being selectively flashed to the brake signal circuit when the selector switch is in one of the other positions, means connecting the flasher circuit to the brake circuit including a normally open switch in the connecting means, a normally closed switch in the brake signal circuit intermediate the electrical source and the point of connection of the flasher and brake signal circuits, and means operatively connected to the shifting means when shifted to its reverse driving condition for actuating the normally open and normally closed switches to opposite conditions whereby both lamps will flash simultaneously whenever the selector switch is in neutral position and the normally open switch is closed.

10. The invention set forth in claim 9 wherein the normally open and normally closed switches comprise contacts of an electrical relay.

11. The invention set forth in claim 9 including right and left lamps at the front of said vehicle, connections to said front lamps through said selector switch to flash the left front and rear lamps in unison and the right front and rear lamps in unison, a second set of make-and-break contacts, a pilot lamp connected to the such second set of contacts, and means controlled by the flasher circuit for operating said pilot lamp make-and-break contacts only when at least two of the front and rear right and left lamps are energized through the flasher circuit.

12. The invention set forth in claim 9 wherein the normally open and normally closed switches are manually operated in response to actuation of the shifting means.

13. Signal means for an automotive vehicle having a source of electrical energy, comprising a pair of lamps at the rear of said vehicle, a first electrical circuit adapted to connect both of said lamps to the electrical source simultaneously, intermittently engaged make-and-break flashing contacts in said circuit, a first normally open switch in said circuit, a brake signal circuit connected to said lamps in parallel with the first circuit, a brake-operated normally open switch in said brake signal circuit, a normally closed switch in said brake signal circuit, and means operatively connecting the first normally open switch and the normally closed switch for actuation together, actuation of said normally closed switch from its normal condition serving to disconnect the brake signal circuit from said lamps and actuation of said normally open switch in response thereto serving to flash both lamps simultaneously.

14. The invention set forth in claim 13 wherein the first normally open switch and the normally closed switch comprise contacts of an electrical relay.

15. The invention set forth in claim 13 wherein the first normally open switch and the normally closed switch are manually operable.

References Cited in the file of this patent

UNITED STATES PATENTS

| | | |
|---|---|---|
| 1,469,337 | Sanborn | Oct. 2, 1923 |
| 2,514,604 | Hollins | July 11, 1950 |
| 2,602,849 | Lawson | July 8, 1952 |
| 2,771,525 | Sivak | Nov. 20, 1956 |
| 2,803,811 | Turney | Aug. 20, 1957 |
| 2,829,213 | Brett | Apr. 1, 1958 |
| 2,835,880 | Daws | May 20, 1958 |